Figure 1:
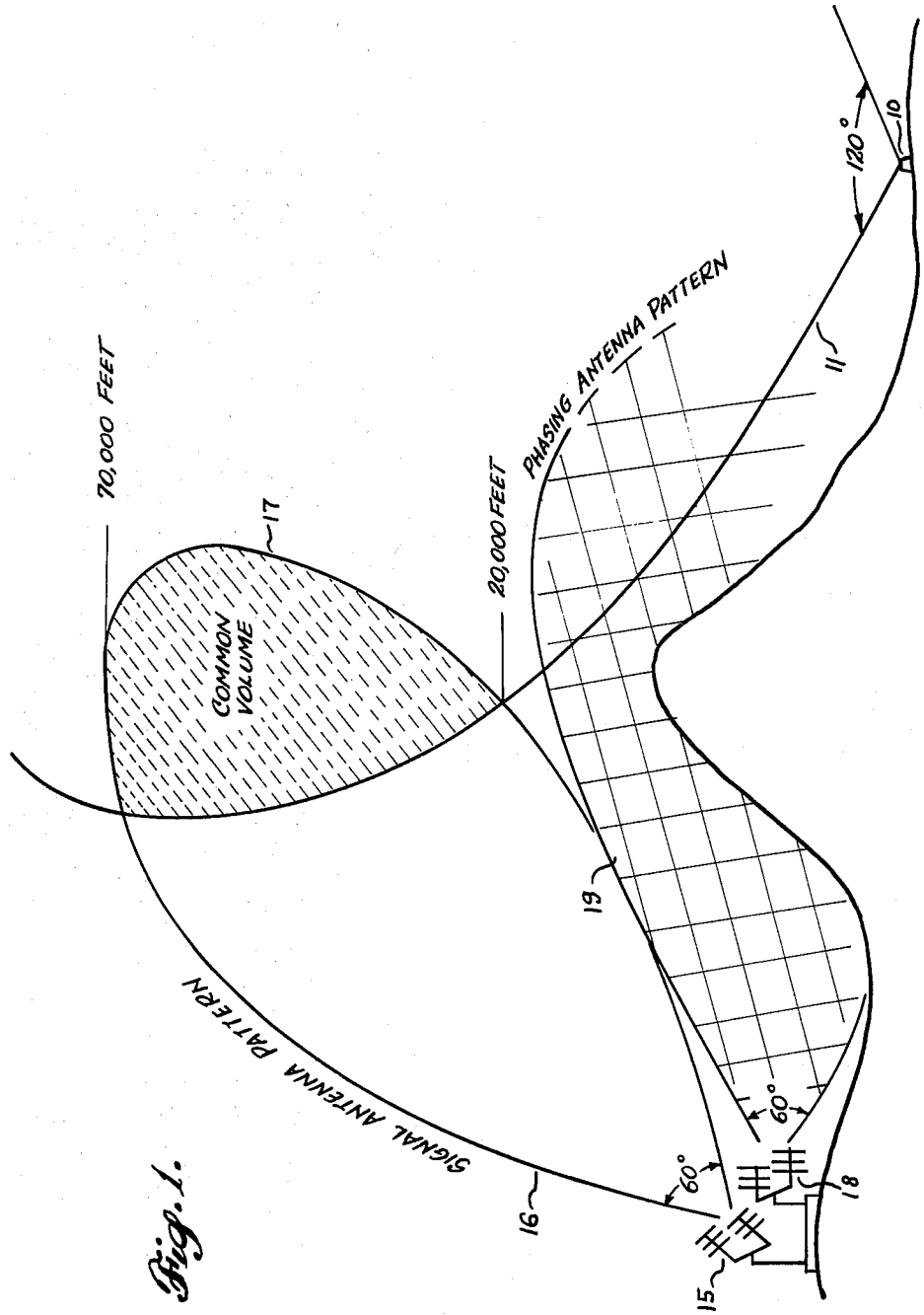

INVENTORS.
CLARENCE D. LUNDEN
WALTER E. BUEHLER
BY
Reynolds & Christensen
ATTORNEYS

United States Patent Office

3,251,057
Patented May 10, 1966

3,251,057
AIR-TURBULENCE DETECTION SYSTEM
Walter E. Buehler, Issaquah, and Clarence D. Lunden, Tacoma, Wash., assignors to The Boeing Company, Seattle, Wash., a corporation of Delaware
Filed July 27, 1964, Ser. No. 385,123
10 Claims. (Cl. 343—5)

The present invention relates to systems for detecting air turbulence and more particularly to an improved air turbulence detection system adapted to detect clear air turbulence which is normally not visible to the human eye.

The safe and comfortable flight of passenger aircraft requires an ability to detect and avoid the various types of air turbulence which occurs in our atmosphere. It is common practice at the present time to utilize weather radar employing wave-lengths in the order of 1 to 10 centimeters to detect various types of objects in the air, including raindrops, hail, snow and cloud droplets. Such weather radar systems are frequently carried by an aircraft and have been found to be useful in detecting severe storm fronts which present sharp air mass boundaries. However with the advent of high flying jet aircraft it has been found that the safe pilotage of such aircraft is occasionally threatened by encounters with high altitude air turbulence which is of a type which is not visible to the eye, which does not exhibit the sharp boundaries associated with normal high density storm areas, and which heretofore has escaped detection by the conventional weather radar sets operating at the short wave-lengths of 1 to several centimeters.

Recent work expended on achieving an ability to forecast and detect clear air turbulence has shown that it is often a mesoscale phenomenon having lateral dimensions in the order of 10 to 100 kilometers and that it moves or varies quite rapidly in time periods measured in minutes and hours, rather than in days. Balloon-borne sounding devices (radiosondes) together with high-speed computing equipment and a complex network of high-speed landline wire services have been brought into operation in order to permit preflight briefing of jet pilots with information regarding areas in the upper atmosphere where clear air turbulence can be expected and which might be encountered by the pilot. However in view of the rapidly changing conditions these coarse-grain forecasts generally prove to be of little direct use to the pilot. With the increasing use of aircraft flying at altitudes and in areas wherein such clear air turbulence is encountered with increasing regularity it would be advantageous to have a convenient and low-cost system for readily detecting the presence of clear air turbulence more accurately and with greater ability to provide updated or continuing information with respect thereto. The ability to provide such information even at fixed locations about the country, as for example in areas near the major air terminals would be of considerable value to the air transport industry.

It is therefore an object of the present invention to provide a clear air turbulence detection system.

A further object of the present invention is to provide an improved air turbulence detection system making use of radar techniques.

Another object of the present invention is to provide an improved and low-cost clear air turbulence detection system adapted to detect the presence of large scale clear air turbulence in the upper atmosphere.

An additional object of the present invention is to provide an improved clear air turbulence detection system including a novel receiver system adapted to make use of signals presently being generated by present day air navigation equipment in a manner such that the overall cost of the clear air turbulence air detection system is minimized.

In accordance with the teachings of the present invention a novel bistatic (transmitter and receiver separated) radar system is utilized which operates at a relatively long wave-length with the transmitter being adapted to illuminate or irradiate a given volume in space and including reaches of the upper atmosphere. A receiving system displaced from the transmitter location is then established and includes a first signal antenna system directed toward a portion of the volume of space being illuminated by the transmitter. The signal antenna is thus adapted to receive reflected or scattered signal information from the common volume encompassed by the transmitting antenna and the signal receiving antenna. Since the object is to detect a large scale turbulence a relatively long wave-length signal system is utilized, which may be in the order of one or several meters. This factor coupled with the nature of the clear air turbulence results in extremely weak back scattered signals during the presence of clear air turbulence in the common volume of the transmitting antenna and the receiving antenna. In general the desired signals have been of such a low power level that the ground wave from the transmitter to the receiver, multipath signals from line of sight, mountain-bounce, and other sources has masked the information signals to the point where little or no information has been obtainable therefrom regarding the clear air turbulence.

Therefore the system of the present invention includes a secondary antenna referred to as a phasing antenna which is aimed along the ground and substantially directly at the transmitting antenna. The two receiving antennas are positioned in a substantially straight line with respect to the transmitting antenna and are separated from each other by a distance which may be in the order of one or more wave-lengths of the transmitter carrier frequency. The combined patterns of the two receiving antennas form a scalloped pattern with a deep null at the horizon to discriminate against the ground wave. A suitable phase adjusting network such as a line stretcher is connected in circuit between one of the antennas and a signal adding network in a manner such that the signal information provided by the phasing antenna to the adding network is 180° out of phase with respect to the signal information provided by the signal antenna. By suitable adjustment of the adding network the signals from the phasing antenna serve to exactly cancel out the unwanted ground wave signal which tends to be received by the signal antenna. With the ground wave signal cancelled from the signal received by the signal antenna the adding network is adapted to provide an output signal which includes only the signal information received from the common volume irradiated by the transmitting antenna and scanned by the signal antenna. This resulting signal is then applied to a sensitive preamplifier and converter which serves in combination with an intermediate frequency amplifier and wave analyzer to provide an appropriate output signal indicating the intensity of back scattered information signals received from the upper atmosphere common volume. An audio indicator such as a pair of headphones and/or a conventional strip chart recorder serves to provide usable information regarding the clear air turbulence thus detected. In accordance with one preferred embodiment of the invention, the transmitter operates in a continuous wave mode of operation with repeated periods of modulation by an intermittently operated audio frequency modulator. The phase adjustment network in the receiving system is made to operate on the higher frenquency of the continuous carrier wave and therefore the necessary accurate phase adjustment required to cause ground wave cancellation is obtained. This has been found in practice to substantially eliminate the unwanted ground wave signals which heretofore have presented a major problem in detecting clear air turbulence in the upper atmosphere.

Figure 2:
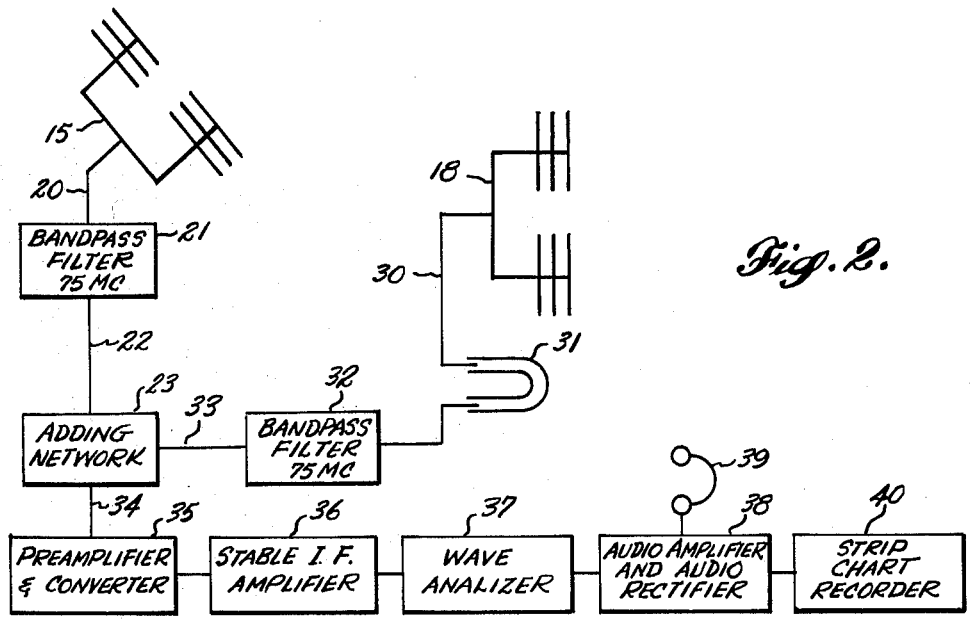
Figure 2A:
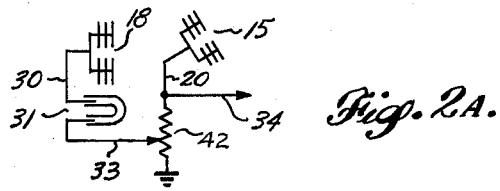
Figure 3:
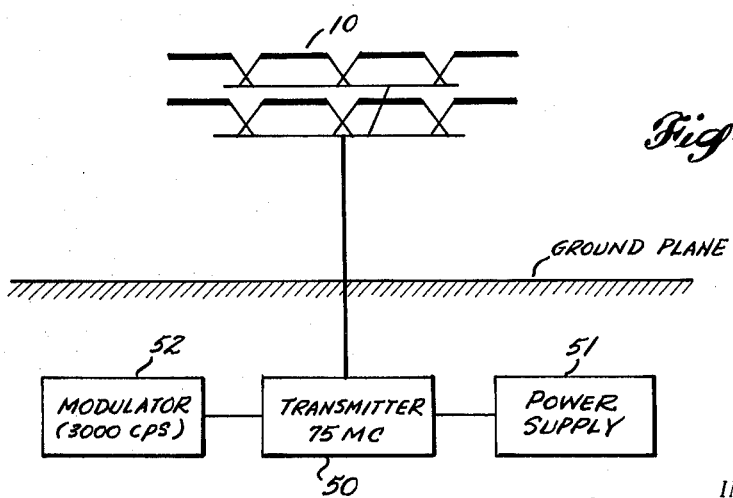

The above and additional objects and advantages of the present invention will be more clearly understood from the following description when read with reference to the accompanying drawings, and wherein, FIGURE 1 is a pictorial representation of the transmitting antenna and the fan-shaped radiation pattern provided thereby together with two receiving antennas at the remote receiver location with an indication of the scanning pattern of the two antennas at the receiving location being shown, FIGURE 2 is a block diagram of the improved receiving system adapted to provide clear air turbulence information in response to the weakly back scattered signals, FIGURE 2A is a schematic circuit diagram showing one simplified form at the adding network of FIGURE 2, and FIGURE 3 is a block diagram in simplified form illustrating one preferred embodiment of a transmitting system adapted for use in accordance with the teachings of the present invention.

Referring now to the drawings and in particular to FIGURE 1 there is shown for purpose of illustration a transmitting antenna 10 adapted to transmit radio frequency energy in a pattern indicated generally at 11. The antenna 10 is adapted to transmit the radio frequency energy substantially straight up from the ground in a fan-shaped pattern of approximately 120° in the embodiment illustrated in FIGURE 1. As described hereinafter, the system for energizing the antenna array 10 is preferably adapted to provide continuous waves (CW) of approximately one or more meters in length with a frequency of 75 megacycles having been found to work well. The continuous wave carrier signal is modulated by an intermittently operating audio frequency modulator.

As further illustrated in FIGURE 1 the detection system includes a receiving system having a signal antenna 15 including an array of conventional twin Yagi antennas aimed at approximately 45° above the horizontal (depending upon the distance from the transmitting antenna) so that the antenna 15 intercepts back scattered energy from the volume of space indicated generally at 17 which is common to the patterns 16 and 11 of the antennas 15 and 10. The scattered power will depend on the levels of turbulence in the common volume. A second receiving antenna 18 is positioned adjacent to the signal antenna 10 and is labeled as a phasing antenna which also includes a pair of conventional Yagi antennas aimed substantially parallel to the ground to scan a volume of space indicated generally at 19. The signal and phasing antennas are separated by approximately two wave-lengths of the carrier frequency signal and are in line with the transmitting antenna and resulting fan-shaped beam 11. As described hereinafter, the signal information detected by the phasing antenna 18 is adjusted in phase relation with respect to the signal information received by the antenna 15 to cause cancellation of the ground wave signal which is received by the signal antenna 15. The net effect of the arrangement is that even though the desired information signals reflected from the common volume 17 during the occurrence of clear air turbulence are of an extremely weak nature, the substantially complete cancellation of ground wave signal information results in the information signals being of sufficient amplitude for processing and utilization in a suitable display or recorder system. While the specific distance from the transmitting antenna to the receiving system is not critical, the system is illustrated in FIGURE 1 with the receiving station being displaced in the order of 10 miles from the transmitting station.

Referring now to FIGURE 2, it will be seen that the signal antenna 15 is connected by the circuit 20 to a first band pass filter 21 which is in turn coupled by the circuit 22 to an appropriate adding network 23. In a similar manner the phasing antenna 18 is connected by the circuit 30 which includes a phase adjustment device illustrated as a line stretcher 31 to a second band pass filter 32 which is in turn connected by circuit 33 to the adding network 23. The filters serve to eliminate interference which might tend to be caused by nearby radio or television stations. The line stretcher or phase adjusting device 31 can be any of a number of devices well known in the art which are adapted to be adjusted to in effect vary the length of the transmission line 30 between the antenna 18 and the band pass filter 32. Thus the phase of the signals received by the adding network 23 from the two antenna systems is readily adjusted to any desired relative phase relationship. The phase adjustment is preferably accomplished on the higher frequency continuous wave carrier which then assures complete cancellation of the ground-wave sneak signals which would mask the intelligence carried by the pulses of audio frequency modulating energy.

In practice the phase adjustment device 31 is set to a condition such that the carrier wave signals received by the two antennas are 180° out of phase when applied to the adding network 23 and therefore are applied to the adding network 23 in a manner such that cancellation therebetween occurs. The adding network 23 may be any one of a number well known in the art. For example there is shown in FIGURE 2A a potentiometer 42 arranged for receipt of the signal information from the two antennas in a manner such that the relative amplitudes thereof are adjusted to produce substantially complete cancellation of the ground wave signal from the signal information provided by the antenna 15. Accordingly, the signal information provided on the output circuit 34 of the adding network 23 contains primarily the desired signal information produced by energy scattered from the common volume of the antennas 10 and 15. This signal information is applied to a high sensitivity preamplifier and converter 35 coupled with a very stable intermediate frequency amplifier 36 which delivers the demodulated audio frequency signals from the modulated carrier to a conventional wave analyzer 37. The wave analyzer 37 in turn provides the desired information signals to an audio amplifier and rectifier 38 which may have earphones 39 connected thereto. The amplifier and rectifier 38 provides proper D.C. current levels to a strip-chart recorder 40.

As set forth in greater detail hereinafter, a continuous wave transmitter operating at a wave-length of over one meter and periodically modulated by an audio frequency signal is preferably utilized for irradiating the common volume 17 of FIGURE 1, it having been found in practice that the use of the long wave-length electromagnetic energy serves to provide information regarding clear air turbulence which is not otherwise obtainable by the use of conventional radar sets operating in the low centimeter range. It is found in practice that refractive layers which may be in the common volume 17 also serve to reflect a substantial portion of the energy transmitted by the transmitter 10. An advantage of the present system as illustrated with particularity in FIGURE 2 is that when a refractive layer is disposed in the common volume 17 the chart recorder indicates a steady continuing signal amplitude which is readily discernible from the signals recorded in response to the random-like signal due to clear air turbulence. The phasing device 31 and adding network 23 can be adjusted so that the signals from the phasing antenna 18 cancel out the additional signals received by the signal antenna 15 during the presence of a refractive layer. Thus the use of two separate antenna systems 15 and 18 in the manner indicated serves to not only eliminate the effects of ground signal information which is received by the signal antenna 15 but also makes possible a convenient means for eliminating the effects of signals reflected by refracting layers.

While the transmitter per se forms no part of the present invention there is shown for purpose of illustration in FIGURE 3 one type of transmitting station which is found to work well in the present system, and as set forth hereinafter, is readily available and in operation at the present time at or near most air terminals. Thus in FIGURE 3 it will be seen that the transmitting station includes a beam-forming antenna array 10 which is energized by a transmitter 50. A suitable power supply 51 serves to provide adequate power for the transmitter 50 to cause radiation of the fan-shaped volume indicated in FIGURE 1 and which preferably extends upwardly for at least 70,000 ft. The system is preferably operated in a continuous wave mode of operation with a suitable pulsed audio frequency modulator 52 being coupled with the transmitter 50.

Since the turbulence which must be detected is a large scale phenomenon a relatively long wave-length transmitter is used. It is found in practice that a transmitter operating at approximately 75 megacycles and having a 100 watt transmitting power capability works well. Low frequency bursts of modulating energy are applied to the transmitter 50, and in practice a 3,000 cycle per second modulator adapted to produce approximately two bursts per second is found to work well. In practice it has been discovered that the conventional fan marker transmitting systems commonly used at most airfields and referred to as fan markers work well for the transmitting portion of the system of the present invention.

There has thus been disclosed an improved system for detecting the presence of turbulence in the upper atmosphere and which is capable of detecting turbulence which is normally not detected by conventional weather radar systems and which is normally not visible to the human eye. By making use of fan markers presently in existence at numerous airfields the system of the present invention makes possible at a low cost an important air navigation aid since the only cost incurred in establishing a system such as that provided herein is the cost of the receiving system. While the invention has been described by reference to specific components and to various transmitters and receivers operating at specified frequencies to teach the present invention, it is intended that those modifications which would be obvious to a person skilled in the art from the teachings hereof will be encompassed by the following claims.

What is claimed is:

1. A system for deriving air turbulence information from a volume of space being irradiated with electromagnetic energy by a source remote from the system, comprising in combination: a first antenna directed toward said volume of space; a second antenna adjacent to said first antenna and directed toward said source; signal phase adjustment means coupled with said second antenna; a signal adding network coupled with said first antenna and with said phase adjustment means, said phase adjustment means and said adding network being adjusted to add in out-of-phase relationship a portion of the signal from said second antenna to the signal from said first antenna with said portion being such that signals received directly by said first antenna from said source are cancelled and an output signal proportional to the energy transmitted by said source and reflected from said common volume to said first antenna is provided; and radio frequency receiver means coupled with said adding network and adapted to provide information regarding the amplitude of the signals received by said first antenna from said first volume as a result of the irradiation of said volume by said source.

2. An air turbulence detecting system comprising in combination: a modulated continuous wave transmitter means adapted to irradiate a selected volume of space with electromagnetic energy; a first antenna positioned remote from said transmitter means and directed toward said volume for receiving turbulence signals therefrom caused by the backscatter of part of said electromagnetic energy directed toward said volume by said transmitter; a second antenna adjacent to said first antenna and directed substantially toward said transmitter; phase adjustment means coupled with said second antenna; an adding network coupled with said phase adjustment means and with said first antenna adapted to provide an output signal proportional to said turbulence signals received by said first antenna from said selected volume, said network including means for adjusting the relative amplitudes of the signals received by said first and second antennas from said transmitter means; and receiver and recorder means coupled with said network and responsive to said output signals for providing a record of the amplitude of said turbulence signals received by said first antenna from said first volume.

3. An air turbulence detecting system in accordance with claim 2 wherein said phase adjustment means includes a line stretcher connected between said second antenna and said network.

4. An air turbulence detecting system in accordance with claim 2 wherein said transmitter includes means providing a periodically modulated continuous wave signal at a frequency of 75 megacycles per second.

5. A system for deriving air turbulence information from a volume of space being irradiated with modulated continuous wave electromagnetic energy by a source remote from the system, said system comprising in combination: a radio frequency receiver; recorder means coupled with said receiver; first and second antennas coupled with said receiver, said first antenna being directed toward said volume of space and said second antenna being directed toward said source, said antennas being located proximate to each other and remote from said source; and means connected between said antennas and said receiver adapted to cancel from the signals provided by said first antenna the electromagnetic energy transmitted by said source to said first antenna other than by scattering from said volume.

6. An air turbulence detecting system in accordance with claim 5 wherein said last-named means includes phase adjustment means adapted to maintain the signals derived from said second antenna substantially out of phase with respect to the phase of the signals derived from said first antenna.

7. An air turbulence detecting system comprising in combination: means including a radio frequency transmitter and a first antenna operative to irradiate a selected volume of space with electromagnetic energy of a first frequency establishing a wave-length greater than one meter and periodically modulated at a second frequency lower than said first frequency; a second antenna directed toward said selected volume of space and adapted to receive electromagnetic energy transmitted from said first antenna and back scattered from said volume of space; a signal adding network coupled with said second antenna and adapted to receive first signals at said first frequency therefrom; means including a third antenna directed toward said first antenna and coupled with said network and adapted to apply to said network signals at said first frequency transmitted by said first antenna and 180° out of phase with respect to said first signals applied to said network; and means including a radio receiver and a recorder coupled with said network adapted to demodulate the signals received by said second antenna and to provide a record of the intensity thereof.

8. A system adapted to detect clear air turbulence in a selected volume of air comprising in combination: transmitter means adapted to direct modulated electromagnetic signals toward said volume at a frequency such that clear air turbulence in said volume will cause a portion of said signals to be backscattered therefrom as turbulence indicating signals; antenna means adapted to receive said turbulence signals and signals directly from said transmitter; circuit means including phase and amplitude adjustment means coupled with said antenna means adapted to separate the said turbulence signals from the signals received directly from said transmitter means to thereby provide output signals proportional to said turbulence signals; and recording means coupled with said circuit means adapted to record said output signals.

9. A system in accordance with claim 8 wherein said transmitter means provides continuous waves of a wavelength longer than one meter and further includes means for intermittently modulating said continuous waves.

10. A method of deriving air turbulence information from a volume of space comprising the steps of directing continuous wave electromagnetic energy from a source at a first location toward said volume, directing a first antenna at a second location remote from said first location toward said volume, directing a second antenna adjacent to said first antenna toward said source, combining and adjusting the phase and amplitude of the output signals from said antennas so that signals received directly by said first antenna from said source are cancelled by the signals received directly by said second antenna from said source and information signals proportional to the energy transmitted by the source and reflected from said volume to said first antenna are provided, and applying said information signals to a radio receiver and air turbulence information output system.

References Cited by the Examiner
UNITED STATES PATENTS 2,804,618    8/1957    Carpenter _____ 343—814

OTHER REFERENCES

Television Antennas, 2nd edition, Donald A. Nelson, Photofact Publication, page 56, 1951.

LEWIS H. MYERS, *Primary Examiner.*

CHESTER L. JUSTUS, *Examiner.*

P. M. HINDERSTEIN, R. D. BENNETT,
*Assistant Examiners.*